March 3, 1931.  C. C. WHITTAKER ET AL  1,794,937
PROTECTIVE SYSTEM FOR LOCOMOTIVES
Filed Feb. 20, 1929    2 Sheets-Sheet 1
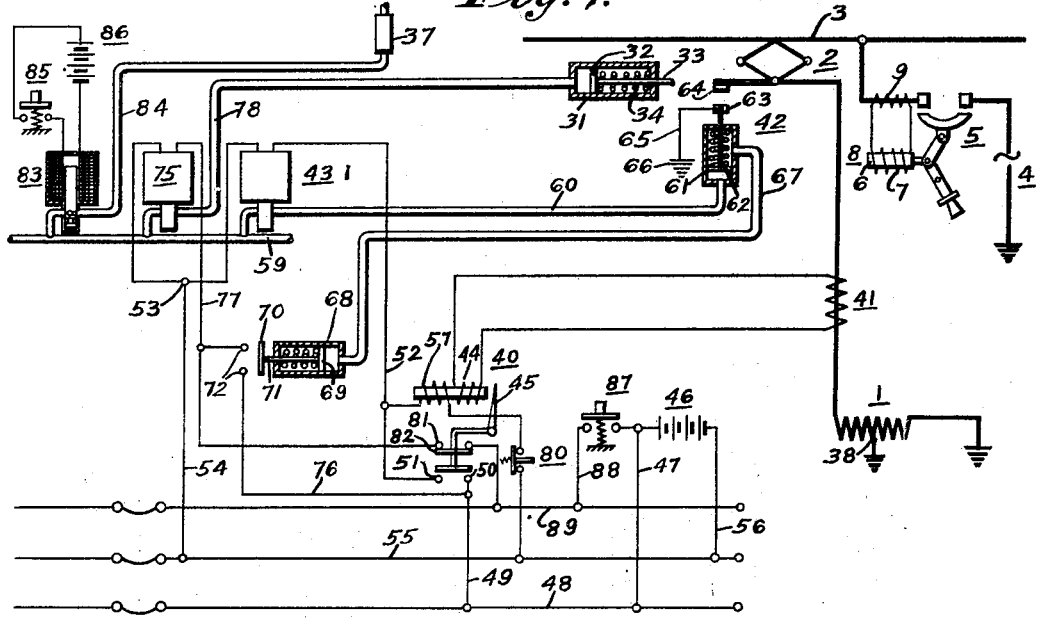
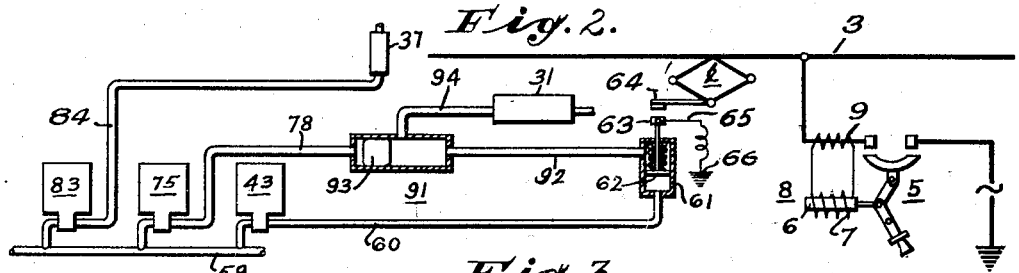
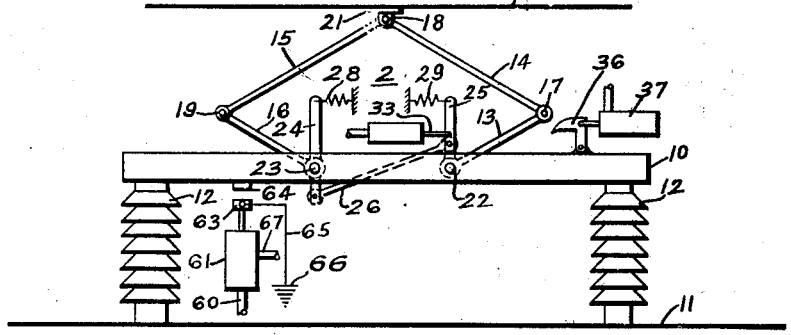
INVENTORS
Charles C. Whittaker &
Walter H. Smith
BY
ATTORNEY INVENTORS
Charles C. Whittaker &
Walter H. Smith
BY
ATTORNEY Patented Mar. 3, 1931

1,794,937

UNITED STATES PATENT OFFICE

CHARLES C. WHITTAKER, OF PITTSBURGH, AND WALTER H. SMITH, OF PHILADELPHIA, PENNSYLVANIA, ASSIGNORS TO WESTINGHOUSE ELECTRIC AND MANUFACTURING COMPANY, A CORPORATION OF PENNSYLVANIA

PROTECTIVE SYSTEM FOR LOCOMOTIVES

Application filed February 20, 1929. Serial No. 341,331.

This invention relates to motor vehicles for electric locomotives, and particularly to protective systems therefor.

An object of the invention is to provide a protective system for motor vehicles that shall be simple in construction and efficient in its operation.

Another object of the invention is to provide for deenergizing the trolley conductor of a railway system upon the occurrence of a fault or ground in the power apparatus of an electric-motor vehicle or locomotive.

A further object of the invention is to provide for disengaging the current collector or pantograph of an electric locomotive from the trolley conductor after the conductor has been deenergized.

Heretofore, it has been the practice, in the construction of electric locomotives, to provide circuit breakers on the locomotives which operated to disconnect the power apparatus of the locomotives from the trolley conductor whenever fault or grounds developed in the apparatus which would cause currents of abnormal values to flow.

Since the trend in the railway art, and particularly with reference to the art of building electric locomotives, is towards the construction of locomotives having larger and larger horsepower capacity for a given size of running-gear and cab space, sufficient cab space is not available to accommodate the motor-generator sets, transformers and other apparatus necessary to perform the mechanical work of the locomotive. Therefore, an effort has been made to develop locomotives having a minimum amount of operating and control apparatus mounted therein. The present invention relates to a power and control system which makes it possible to mount the protective circuit breakers for the locomotive in the power stations instead of on the vehicle, thereby increasing the space available for the other apparatus.

The feeder circuits for the trolley conductors employed in electric-railway systems are provided with feeder circuit breakers for deenergizing sections of the trolley conductor whenever an abnormal current of a predetermined value flows. In the present invention, we have provided current-responsive means on the locomotive for causing such abnormal current to flow whenever a fault occurs in the apparatus of the locomotive in order that the pantograph or current collector may be disengaged from the trolley conductor when no current is flowing in the circuit. If the pantograph or current collector should be inadvertently lowered while current is flowing, the trolley conductor would be burned off or severed because of the arc which would be drawn by the separation of the pantograph from the trolley conductor. When the trolley conductor has been deenergized, means are provided for lowering the pantograph or the current collector, whereby the faulty locomotive, if it be assumed that a plurality of locomotives are operated in multiple, may be taken out of service without further damaging the apparatus.

The apparatus and circuits, arranged in accordance with the invention, operate to prevent the pantograph from being lowered at any time except when the trolley conductor has been deenergized. Whenever the pantograph of the faulty locomotive has been lowered or disconnected from the trolley conductor, the feeder circuit breaker may be reclosed to reenergize the trolley conductor.

For a fuller understanding of the invention, reference may be had to the following description, taken in conjunction with the accompanying drawings, in which, Figure 1 is a schematic illustration of the circuits and apparatus arranged in accordance with the invention;

Fig. 2 is a similar view of a modification of the invention;

Fig. 3 is a side elevational view of a pantograph, schematically illustrated, which may be embodied in the apparatus shown in Figs. 1 and 2;

Figure 4:
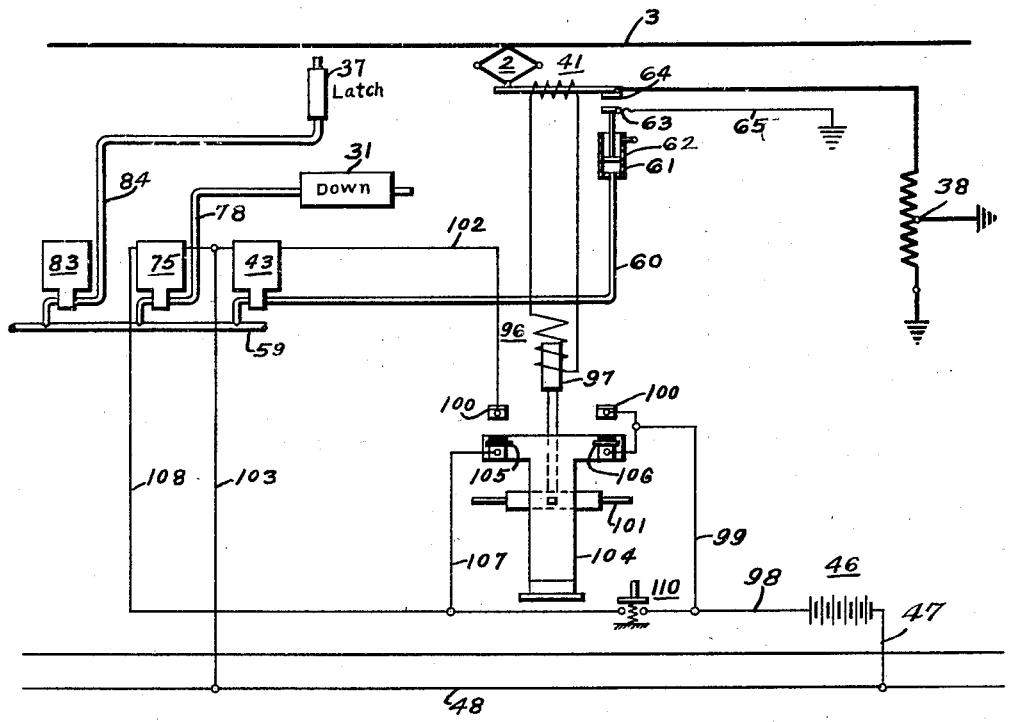
Fig. 4 is a schematic view of a still further modification of the invention, as illustrated in Fig. 1.

In the drawings, a motor vehicle or electric locomotive is provided with a transformer 1 and a pantograph or current collector 2 disposed to connect the transformer to a trolley conductor 3 from which the locomotive obtains the necessary power required for its operation.

The trolley conductor 3 may be supplied with alternating current power from any suitable source, indicated symbolically at 4. The source of power indicated at 4 may be connected to the trolley conductor 3 by means of a feeder circuit breaker 5 of any suitable construction.

In order that the trolley conductor may be deenergized when a current of a predetermined value is flowing, as, for example, a current having the characteristics of one resulting from a short circuit or a ground, a current-responsive tripping device 8 is provided. As shown, the tripping device comprises a coil 7 disposed to actuate an armature 6 connected to the toggle mechanism of the circuit breaker 5. The coil 7 is connected to a current transformer 9 which is energized in accordance with the rate of current flow from the source 4 to the trolley conductor 3. When a current of a predetermined value or characteristic flows in the trolley conductor 3, the current transformer 9 will be so energized that the armature 6 will be actuated to trip the circuit breaker 5 to its open-circuit position, thereby deenergizing the trolley conductor 3.

The pantograph 2, shown in the drawing, if of the collapsible type, although other forms of construction may be utilized. As shown in Fig. 3, the pantograph is mounted on a metal supporting frame 10 which is supported on the roof 11 of the cab structure of the locomotive. The frame 10 may be insulated from the cab structure 11 and spaced therefrom by means of bushings 12 of suitable insulating material and construction.

The pantograph, as shown, comprises links 13, 14, 15 and 16 pivotally connected at 17, 18 and 19. A trolley shoe or contact member 21 is supported by the links 14 and 15 at the pivotal connection 18, the shoe being disposed to engage the trolley conductor when the pantograph is in its raised position, as shown in the drawings.

Adjacent ends of the links 13 and 16 are pivotally supported on the frame 10 by means of shafts 22 and 23 which extend transversely through the frame 10 and the adjacent ends of the respective links 13 and 16.

In order that the shafts 22 and 23 may be so turned that the links 13, 14, 15 and 16 are actuated simultaneously to effect vertical straight-line movement of the pantograph shoe 21, cranks 24, 25 and a connecting rod 26 are provided. As shown, the cranks 24 and 25 are secured to the shafts 22 and 23, and the connecting rod 26 is so disposed that any turning movement imparted to the shaft 22 will be imparted to the shaft 23. However, the shafts 22 and 23 will always turn in opposite directions.

As shown in the drawings, the pantograph is biased towards its raised position, that is, the position in which the pantograph shoe 21 engages the trolley conductor 3 by means of springs 28 and 29 that are operatively connected to the upper ends of the cranks 24 and 25.

In order to lower the pantograph 2, a cylinder 31 and an air-operated piston 32 are provided. As shown, the piston rod 33 is connected to the crank 25 which is disposed to turn the shaft 22. The piston 32 may be of the spring-return type, and, accordingly, a spring 34 is provided for returning the piston to its normal position when the air pressure is released.

In order to lock the pantograph in its lowered position, a latch 36 is provided. As shown, the latch is pivotally mounted on the frame 10 and is disposed for operation by an air-operated piston-and-cylinder assembly 37, the construction of which is similar to the cylinder 31 and piston 32.

When a fault occurs or develops in the transformer 1, as, for example, a ground, as indicated at 38, the probabilities are that the transformer will be seriously damaged unless the power is disconnected therefrom as quickly as possible. That is, the feeder circuit breaker 5 must be actuated to its open-circuit position, so that the trolley 2 may be lowered out of engagement with the trolley conductor 3. In order to effect operation of the feeder circuit breaker 5 when a fault occurs in the transformer 1, as indicated at 38, a current-responsive relay 40, a current transformer 41, a pantograph-grounding switch 42 and a magnetically operated air valve 43 are provided.

When a fault in the transformer 1 occurs, a coil 44 of the relay 40 will be energized from the current transformer 41, whereby an armature 45 of the relay is actuated to establish a circuit for the actuating coil of the electro-magnetically operated air valve 43. The circuit may be traced from battery 46, conductors 47, 48 and 49, contact members 50 and 51 of the relay 40, conductor 52, the actuating coil of the valve 43, junction point 53 and conductors 54, 55 and 56, back to the battery 46. Simultaneously with the closing of the contact members 50, and 51, a circuit is established for a holding coil 57 of the relay 40. This circuit may be traced from the battery 46, through conductors 47, 48 and 49, contact members 50 and 51 of the relay, coil 57 and conductors 55 and 56, back to the battery 46. Therefore, the relay 40 will remain closed.

When the actuating coil of the magnet valve 43 has been energized, air will be admitted from a supply pipe 59, containing air at a suitable pressure, through the valve of the magnet valve 43, pipe 60 to cylinder 61 of the grounding relay 42. When the air enters the cylinder, a piston 62 is actuated upwardly until a contact member 63 of the grounding relay, carried by the piston rod of the piston 62, engages the contact member 64 mounted on the steel frame 10 which carries the pantograph 2. When the contact members 63 and 64 are in engagement, the trolley conductor 3 is grounded through a circuit which extends from the trolley conductor 3, through the pantograph 2, the contact members 63 and 64 and the conductor 65, to ground at 66. Upon the establishment of the ground circuit, the transformer 9 will be energized by a current of such a value that the armature 6 of the tripping relay 8 will be actuated to release the circuit breaker 5 to its open-circuit position. The trolley conductor 3 is, therefore, deenergized.

When the piston 62 of the grounding relay 42 has been actuated to its uppermost position, air will be diverted from the cylinder 61, through a pipe 67, to a cylinder 68 having a piston 69 therein which is disposed to actuate a contact member 70 carried by the piston rod 71. When air enters the cylinder 68, the contact member 70 is actuated into engagement with the stationary contact members 72, whereby a circuit is completed for the actuating coil of a magnet valve 75 which controls the admission of air to the pantograph cylinder 31. The circuit for the actuating coil of the magnet valve 75 may be traced from the battery 46 through conductors 47, 48 and 49, conductor 76, contact members 70 and 72, conductor 77 and the coil of the magnet valve 75, to junction point 53, conductors 54 and 55 and thence back to the battery 46.

When the magnet valve 75 is actuated, air will be admitted to the cylinder 31 from supply pipe 59, through pipe 78, into the cylinder 31. The piston 32 will then be actuated to the right, whereby the crank 25 (Fig. 3) is turned in a clockwise direction, and the crank 24 in a counter-clockwise direction. The pantograph will then be lowered and, when in its lowermost position, will be latched or locked by the latch 36.

Since the apparatus usually is in need of repair when the grounding relay 42 has been caused to operate in the manner set forth above, the pantograph 2 will not be raised again until the apparatus has been inspected to determine the source of the trouble. When the trouble has been located and rectified or the necessary repairs made, the pantograph may be raised again.

In order to raise the pantograph, the magnet valves 43 and 75 must be closed in order to cut off the air supply to the cylinders 61 and 31, respectively. In order to deenergize the magnet valves 43 and 75 to close them, the holding coil 57 of the relay 40 must be deenergized. In order to deenergize the relay, a normally closed push-button switch 80 is provided. When the switch 80 has been actuated, the coil 57 will be deenergized, and the armature 45 will return to the position shown in Fig. 1 of the drawings, in which position, contact members 81 and 82 of the relay are closed. When the air has been released from the cylinders 61 and 31, the pistons will be returned by the springs, provided in the cylinder, to their normal positions. The pantograph 2 may now be raised by actuating the latch 36. In order to actuate the latch 36, a magnet valve 83 is provided. When the magnet valve 83 has been energized, air will be admitted from the supply pipe 59, through the magnet valve and a pipe 84, to the cylinder 37. A piston in the cylinder (not shown) will then be actuated to the right to operate the latch 36 to release the pantograph to its raised position. In order to actuate the magnet valve 83, a push-button switch 85 is provided. When the push-button switch 85 is closed, the actuating coil of the magnet 83 is connected across a battery 86.

In order to lower the pantograph 2, in the event that no power is being supplied to the apparatus of the locomotive, an auxiliary push-button switch 87 is provided. When the switch 87 is actuated, a circuit is established for the coil of the magnet valve 75 which may be traced from the battery 46 through the push-button switch 87, conductors 88 and 89, contact members 81 and 82 of the relay 40, conductor 77, the actuating coil of the magnet valve 75, junction point 53 and conductors 54, 55 and 56, back to the battery. When the valve 75 has been actuated, air will be admitted through the pipe 78 to the cylinder 31 in the manner hereinbefore set forth, and the pantograph will be lowered and will be latched in its lowered position by the latch 36.

In the modification shown in Fig. 2 of the drawing, the relay, comprising the cylinder 68, the piston 69 and the contact member 70, is dispensed with and a two-way valve 91 substituted. When the magnet valve 43 has been energized by operation of the relay 40, air pressure will be admitted to the cylinder 61 from the supply pipe 59 through the magnet valve 43 and the pipe 60. When the piston 62 has been raised to its uppermost position, air will be admitted, through a pipe 92, to the three-way piston valve 91. When the air is admitted to the valve 91, a piston 93 is actuated to the left to close the entrance to the valve 91 from the pipe 78 which leads to the magnet valve 75. Air will then flow from the valve 91, through a pipe 94, into the lowering cylinder 31, and the pantograph will be lowered in the manner previously described herein.

In the event that it is desired to lower the pantograph 2 when no power is supplied to the locomotive apparatus, the push-button switch 87 may be actuated to energize the magnet valve 75. When the magnet valve 75 has been actuated, air will be admitted into the valve 91 from the supply pipe 59 through the magnet valve 75 and the pipe 78. When the air enters the valve 91 from the pipe 78, the piston 93 will be actuated to the right to close the pipe 92. Air will then flow from the valve 91, through the pipe 94, into the cylinder 31, and the pantograph will be lowered.

In the modification shown in Fig. 4 of the drawings, a relay 96 has been substituted in place of the relay 40, and the current transformer 41 has been shifted to the frame 10. When the transformer 41 is in the position shown in Fig. 4, it will always be energized, so long as current flows from the trolley conductor 3, through the pantograph, the contact members 63 and 64 and conductors 65, to ground 66. That is, the current transformer 41 is always in the ground circuit established by the grounding relay 42 when it is closed.

The construction of the relay 96 is such that it will not permit the magnet valve 43 to be energized until the circuit interrupter 5 has been actuated to deenergize the trolley conductor 3. Thus, it will be apparent that the pantograph 2 will not be lowered, in any event, until the power source has been disconnected from the trolley conductor 3.

Figure 5:
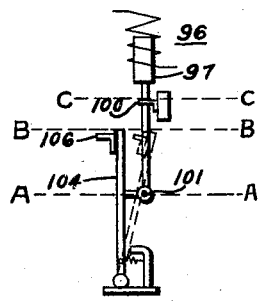
Fig. 5 is a schematic illustration of a relay, shown in Fig. 4, which controls the lowering cylinder of the pantograph.

Assuming that a ground or fault has occurred or developed in the transformer 1 at 38, current will flow and energize the current transformer 41, whereby the relay 96 will be energized. When the coil of the relay 96 is energized, the armature 97 will be actuated to the position indicated at C (Fig. 5). When the relay is in this position, a circuit is established for the actuating coil of the magnet valve 43. This circuit may be traced from the battery 46, through conductors 98 and 99, contact members 100 and 101, conductor 102, the coil of magnet valve 43 and conductors 103, 48 and 47, to the battery 46. The coil of the magnet valve having been energized, air will be admitted to the cylinder 61, whereby the piston 62 will be actuated to its uppermost position, in which position contact member 63 engages the contact member 64. The magnet valve 43 will remain energized until the circuit breaker 5 has operated, because, until the breaker 5 has opened, current will flow in the circuit to maintain the current transformer 41 energized.

It is to be observed that, when the relay 96 has been actuated to position C, a latch 104, having contact members 105 and 106 mounted thereon and insulated therefrom, will be actuated to the right, as indicated in Fig. 5. Therefore, when the relay 96 is deenergized, responsive to the opening of the circuit breaker 5, the armature of the relay 96 will drop, thereby causing the contact member 101 to bridge the contact members 105 and 106, whereby a circuit is established for the actuating coil of the magnet valve 75. This circuit may be traced from the energized conductor 99, through contact members 106, 101 and 105, conductors 107 and 108, the coil of the magnet valve 75 and conductors 103, 48 and 47, to the battery 46. The coil of the magnet valve 75 having been energized, air will be admitted to the down cylinder 31, whereby the pantograph 2 will be actuated to its lowermost position, in which position it will be locked in place by the latch 36.

In order to deenergize the magnet valve 75 to release the air supply to the cylinder 31, the latch 104 must be actuated manually to the position shown in full lines in Fig. 5. In this position, the relay 96 will be permitted to drop to its lowermost position or position A.

If it is desired to lower the pantograph when power has been disconnected from the trolley conductor 3 or from the apparatus on the locomotive, a push-button switch 110 may be closed to energize the magnet coil of the valve 75. As will be observed, the push-button switch 110, when closed, bridges the contact members 105 and 106 of the relay 96.

Various modifications may be made in the circuits and apparatus herein disclosed and arranged in accordance with the invention without departing from its spirit and scope. It is desired, therefore, that the arrangement of circuits and apparatus herein disclosed be interpreted as illustrative and not in a limiting sense.

We claim as our invention:

1. In a motor vehicle, in combination, a trolley conductor, a source of electric power, circuit-interrupting means for connecting the source of electric power to the trolley conductor, a transformer, a current collector disposed to engage said trolley conductor for connecting said transformer to the source of power, means responsive to abnormal current flow in the transformer for grounding said current collector, and means responsive to the current flow incident to the grounding of said current collector for so actuating the circuit-interrupting means that the source of power is disconnected from the trolley conductor.

2. In a motor vehicle, in combination, a trolley conductor, a source of electric power, circuit-interrupting means for connecting the source of electric power to the trolley conductor, a transformer, a current collector disposed to engage said trolley conductor for connecting said transformer to the source of power, means responsive to abnormal current flow in the transformer for grounding said current collector, means responsive to current flow incident to the grounding of said current collector for so actuating the circuit-interrupting means that the source of power is disconnected from the trolley conductor, and means controlled by said grounding means for actuating the current collector out of engagement with the trolley conductor.

3. In a control system for motor vehicles provided with a transformer and a current collector for energizing the transformer with current from a trolley conductor, in combination, a source of alternating-current power, a circuit breaker for connecting said trolley conductor to the power source, means for causing said current collector to engage said trolley conductor, means for opening said circuit breaker responsive to short-circuit conditions imposed on the trolley conductor, means responsive to abnormal currents incident to faults in said transformer for imposing a short circuit on said trolley conductor to thereby cause the circuit breaker to disconnect the source of power from the trolley conductor, and means controlled by said abnormal current-responsive means for actuating the current collector out of engagement with said trolley conductor.

4. In a control system for motor vehicles provided with a transformer and a current collector disposed in circuit relation therewith, in combination, a trolley conductor disposed to be engaged by said current collector, a source of alternating-current power, a circuit breaker for connecting said source of power to the trolley conductor and disposed to disconnect said source therefrom when a fault occurs in a circuit supplied with power from the trolley conductor, means for causing said current collector to engage the trolley conductor, means responsive to abnormal currents incident to a fault in said transformer for grounding said current collector whereby said circuit breaker may be caused to disconnect the source of power from the trolley conductor, and means, controlled by said current responsive means, for actuating the current collector out of engagement with the trolley conductor.

5. In a control system for a vehicle provided with power apparatus and a current collector disposed to engage a trolley conductor whereby electric power may be supplied to the power apparatus, in combination, a trolley conductor, a source of electric power therefor, means responsive to abnormal current flow in said conductor for disconnecting the source of power from the conductor, and means disposed to ground said current collector in response to a fault in said power apparatus, whereby abnormal current flow in said conductor may be effected.

6. In a control system for a vehicle provided with power apparatus and a current collector disposed to engage a trolley conductor whereby electric power may be supplied to the power apparatus, in combination, a trolley conductor, a source of electric power therefor, means responsive to abnormal current flow in said conductor for disconnecting the source of power from the conductor, means disposed to ground said current collector in response to a fault in said power apparatus, whereby abnormal current flow in said conductor may be effected, and means controlled by the operation of said grounding means for disengaging said current collector from the trolley conductor.

7. In a control system for a vehicle provided with power apparatus and a current collector disposed to engage a trolley conductor whereby electric power may be supplied to the power apparatus, in combination, a trolley conductor, a source of electric power therefor, means responsive to an abnormal current flow in said conductor for disconnecting the source of power from the conductor, means disposed to ground said current collector in response to a fault in said power apparatus, whereby abnormal current flow in said conductor may be effected, and means for locking the current collector in its disengaged position.

8. In a control system, in combination, a trolley conductor, a source of power supply therefor, power-consuming apparatus, a current collector connected to said apparatus and disposed to engage said trolley conductor, and means responsive to a fault in said power apparatus for grounding said current collector.

9. In a control system, in combination, a trolley conductor, a source of power supply therefor, power-consuming apparatus, a current collector connected to said apparatus and disposed to engage said trolley conductor, means responsive to a fault in said power apparatus for grounding said current collector, and means for maintaining said ground connection.

10. In a control system, in combination, a trolley conductor, a source of power supply therefor, power-consuming apparatus, a current collector connected to said apparatus and disposed to engage said trolley conductor, a switch disposed to ground said current collector whereby said power apparatus is deenergized, and means responsive to a fault in said power apparatus for actuating said switch to its grounded position.

11. In a control system, in combination, a trolley conductor, a source of power supply therefor, power-consuming apparatus, a current collector connected to said apparatus and disposed to engage said trolley conductor, means responsive to a fault in said power apparatus for grounding said current collector, means for maintaining said ground connection, and means controlled by said grounding means for actuating the current collector out of engagement with said trolley conductor.

12. In a control system, in combination, a trolley conductor, a source of power supply therefor, power-consuming apparatus, a current collector connected to said apparatus and disposed to engage said trolley conductor, means responsive to a fault in said power apparatus for deenergizing said trolley conductor, means for actuating the current collector out of engagement with the trolley conductor, and means for delaying the operation of said current-collector actuating means until the trolley conductor has been deenergized.

In testimony whereof, we have hereunto subscribed our names this 16th day of January, 1929, and this 18th day of February, 1929, respectively.

CHARLES C. WHITTAKER.
WALTER H. SMITH.